Feb. 9, 1971    F. D. DORMAN    3,561,253
APPARATUS AND METHOD OF MEASUREMENT OF PARTICULATE MASS
Filed March 26, 1969    3 Sheets-Sheet 2

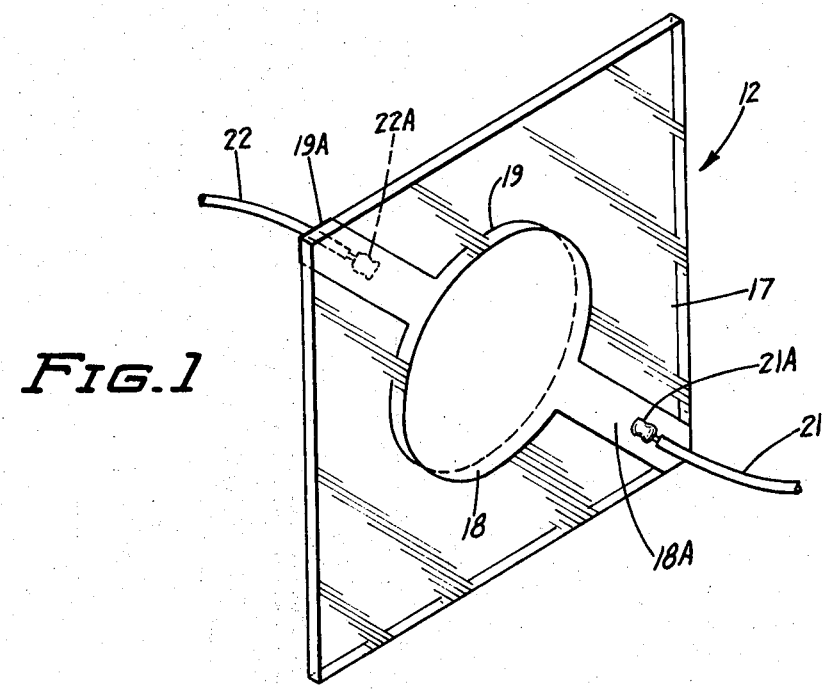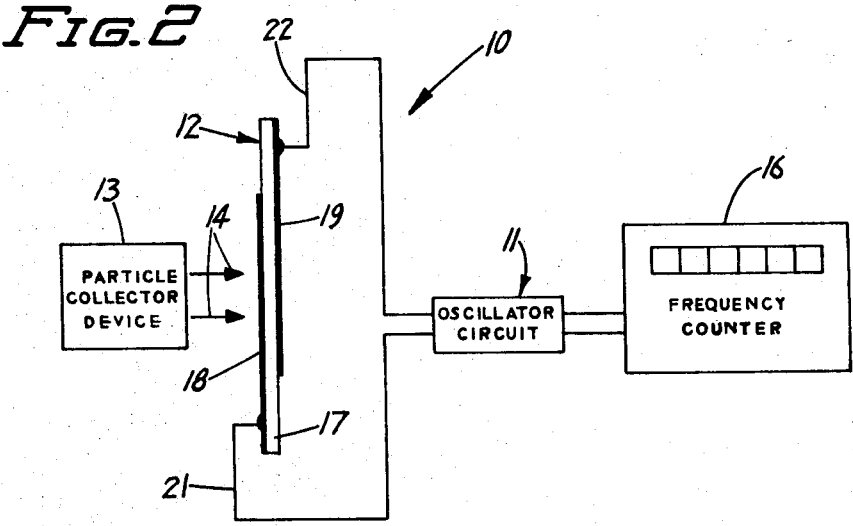

INVENTOR.
FRANK D. DORMAN
BY Burd, Braddock & Bartz
ATTORNEYS

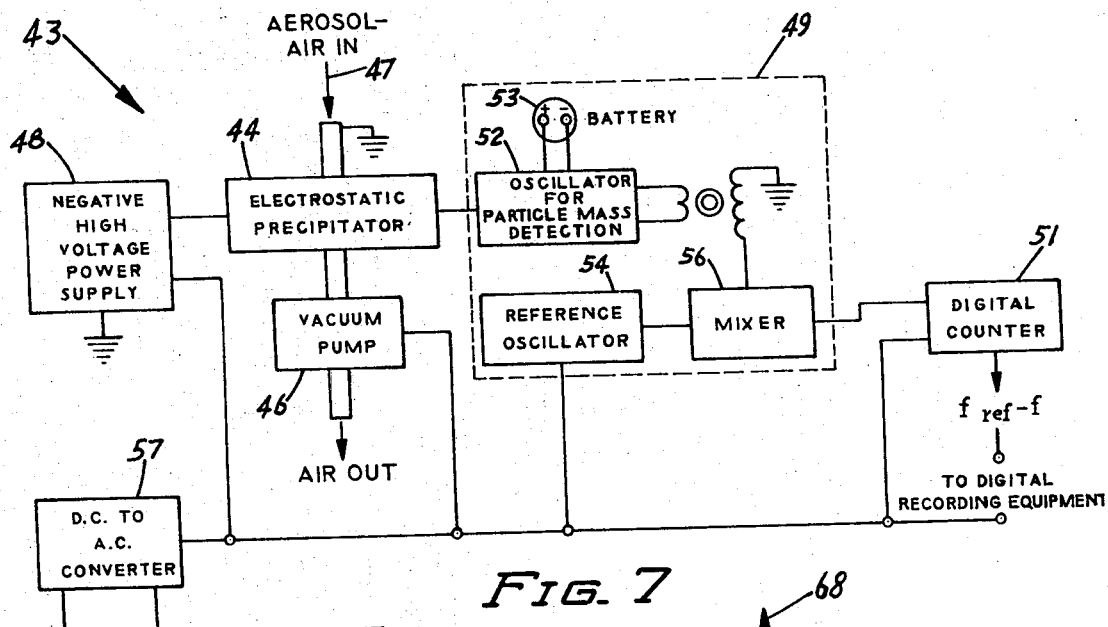
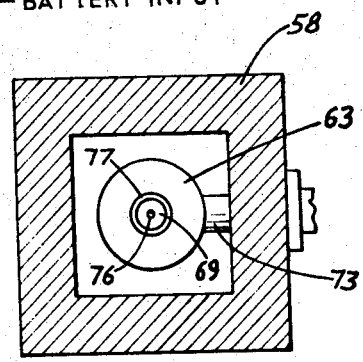
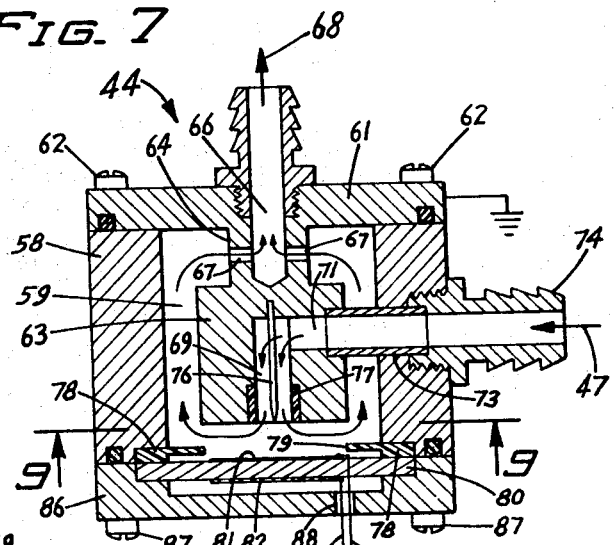
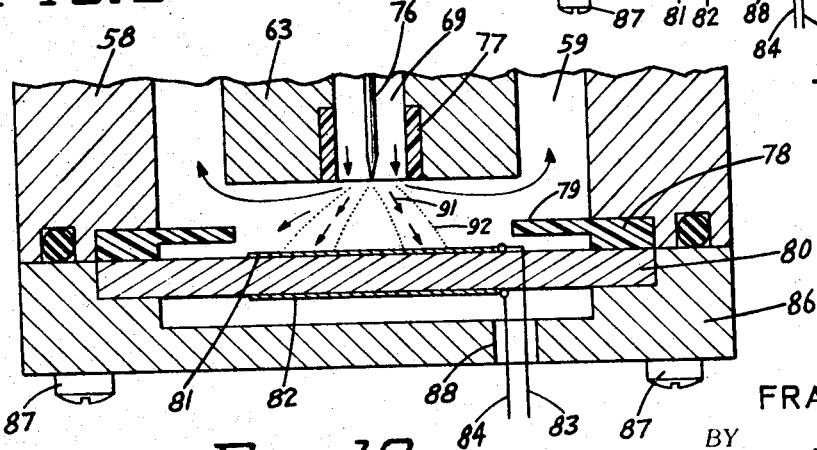

United States Patent Office 3,561,253
Patented Feb. 9, 1971

3,561,253
APPARATUS AND METHOD OF MEASUREMENT OF PARTICULATE MASS
Frank D. Dorman, St. Paul, Minn., assignor to Thermo-Systems, Inc., St. Paul, Minn., a corporation of Minnesota
Filed Mar. 26, 1969, Ser. No. 810,659
Int. Cl. G01n *15/06, 27/00*
U.S. Cl. 73—28                                 33 Claims

ABSTRACT OF THE DISCLOSURE

A particle measurement apparatus having an oscillator circuit with a quartz crystal carrying electrode films to detect particle mass force-collected on a surface of a film by reading the change in the resonant frequency of the quartz crystal. The oscillator circuit is combined with a device for force-collecting particles on the electrically-driven film. The electrical signal of the oscillator circuit is monitored by a frequency-counting device.

BACKGROUND OF THE INVENTION

One of the characteristics of a quartz crystal oscillator circuit is that the quartz crystal will force the oscillator circuit to oscillate at one of the quartz crystal resonant frequencies. This resonant frequency will change with the deposition of mass on the surface of the quartz crystal. This characteristic of quartz crystals has given quartz crystal oscillator circuits wide applications, as transducers, for measurement of thickness and mass of vacuum-deposited thin films.

The rapid measurement of the mass of small particles, as dusts, powders, smokes, mists, fine liquid and solid aerosol particles, and the like is important in the field of air pollution, chemical warfare, industrial processes and particle research. The nature of these particles makes it desirable that an accurate measurement be achieved in a relatively short period of time.

SUMMARY OF THE INVENTION

The invention relates to an apparatus for measurement of particle mass including mass sensing means, as a quartz crystal and like elements, to measure the mass of particles force-deposited on the surface of the sensing means. A force field is used to bring the particles in contact with the surface of the sensing means. Small particles which contact the surface of the mass sensing means strongly adhere to that surface and hence add to the mass of the mass sensing means. The bonding force between the deposited particles and the mass sensing means is not necessarily dependent on the force field used to deposit the particles on the mass sensing means. A frequency sensing means, as an oscillator circuit, senses the change in the resonant frequency of the sensing means during the deposition of the particles on the surface of the sensing means. When particles are deposited on a surface of the particle mass sensing means with the force field, the resonant frequency of the particle mass sensing means decreases in response to the accumulation of particle mass on the surface. The ability of an oscillator circuit to detect with high sensitivity in a short period of time the mass of particles collected on the surface of the particle mass sensing means with a force field makes it highly attractive for achieving in-situ, high-time-resolution particle mass measurement. The mass sensing means is used in an apparatus wherein the particles are deposited onto the surface of an electrically-driven portion of the sensing means. The change in the resonant frequency of the sensing means is monitored with a frequency counter.

The quartz crystal oscillator is a fundamental transducer for particulate mass. It can therefore be utilized as the essential component of a variety of particulate collection devices, such as, single- and multi-stage impactors and electrostatic, gravitational, and centrifugal collection devices, and like devices used to collect particles onto surfaces. The quartz crystal oscillator used in conjunction with such devices will facilitate obtaining an in-situ, transduced measurement of, for example, the mass concentration of an atmospheric aerosol with very high time resolution, which can closely approach that of real time. An object of the invention is to provide an apparatus using an oscillator circuit with a particle mass sensing means to make rapid particle mass measurement in any desired location.

In the drawings:

FIG. 1 is a perspective view of a particle sensing quartz crystal attached to electrical leads;

FIG. 2 is a diagram of the apparatus of the invention for particle mass measurement;

FIG. 7 is a schematic of an electrostatic precipitator apparatus for measurement of particle mass;

FIG. 8 is a sectional view of an electrostatic precipitator having a particle sensing means;

FIG. 9 is a sectional view taken along line 9—9 of FIG. 8; and

FIG. 10 is an enlarged fragmentary sectional view of the precipitator of FIG. 8 showing its principle of operation.

Figures 3, 4, 5, 6:
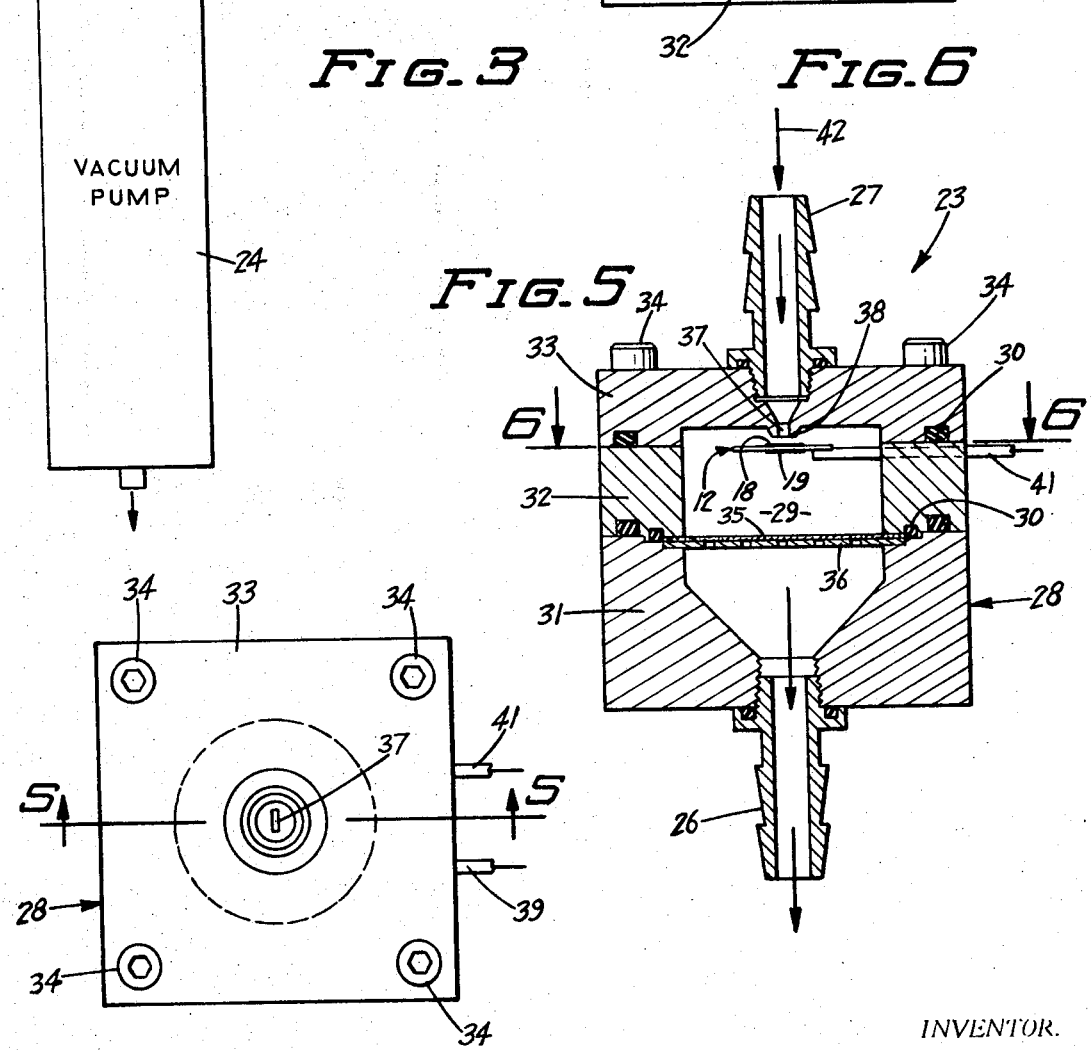
FIG. 3 is a diagrammatic view of an impactor apparatus for particle mass measurement.
FIG. 4 is a plan view of the single stage impactor of FIG. 3 having a particle mass sensing means.
FIG. 5 is a sectional view taken along line 5—5 of FIG. 4.
FIG. 6 is an enlarged view taken along line 6—6 of FIG. 5.

Referring to the drawings, there is shown in FIG. 2, an apparatus indicated generally at 10 for particle mass measurement. The particles are relatively small masses of liquid and/or solid particles as small agglomerations of molecules including, but not limited to, aerosols, dusts, powders, smokes, mists, fogs, and like substances. Apparatus 10 is used to detect the particle mass in a selected location in a relatively short period of time. Apparatus 10 has an oscillator circuit 11 including a particle mass sensing means 12 which accumulates particles over a period of time producing a change in the resonant frequency of the sensing means. This changing frequency is monitored to provide a reading which is a function of the particle mass accumulated on the sensing means.

The particles are directed towards the particle sensing means by a force field generated by the particle collector device 13. Device 13 can be of a type that collects particles on the sensing means by impaction, (i.e. an inertial force field), by electro-static forces, gravitational forces, centrifugal forces, thermal forces, magnetic forces and light radiation forces. The impaction method utilizes the relative motion between the sensing means 12 and the particles as indicated by arrows 14 to impinge and collect the particles on a surface or face of the sensing means. This relative motion can be accomplished through the movement of the particles toward the sensing means or moving the sensing means into the particles. The particle collecting surface of the sensing means can be moved in a periodic motion relative to a nozzle or other means directing particles toward the sensing means to obtain uniform particle distribution on the particle collecting surface.

The oscillator circuit 11 with the particle mass sensing means 12 is usable in particle samplers and particle analyzers to provide a reading of particle mass which can be monitored by frequency counter 16.

The monitoring can be done continuously or at various time intervals and recorded in information-storing means. The frequency counter or similar monitoring equipment and a recording device can be packaged in a portable configuration, with or without an oscillator circuit so that it can be plugged into various particle mass sensing means to provide the mass measurement of particles collected on the surface of the sensing means.

The particle sensing means 12 is made up of an element having surfaces for the deposition of particles and consisting of a material having a definite internal crystalline structure with a measurable natural frequency. This element when in an oscillator circuit will oscillate at, or very near, one of its resonant frequencies. The resonant frequency of the sensing means will change with deposition of particle mass on its surface. The sensing material is any material which exhibits piezoelectric properties. Several such materials are known, for example, crystals such as quartz, tourmaline, and Rochelle salts and other materials such as barium titanate.

An example of a particle mass sensing means is an AT cut quartz crystal 17, such as that shown in FIG. 1. The crystal has a low temperature coefficient, with vibration characteristics in the thickness shear mode. The low temperature coefficient makes the crystal relatively insensitive to changes in ambient temperatures. As shown in FIG. 1, the quartz crystal 17 has a flat and rectangular configuration. Quartz crystals with circular configurations can also be used. Bonded to the opposite flat faces of the crystal with an adhesive or other bonding materials or by a vacuum-deposition process are circular thin electrode films 18 and 19 of electro-conductive material, as silver, copper or any other electrical conductor capable of being bonded to the crsytal. Films 18 and 19 are mechanically bonded to the central portions of opposite flat faces of the crystal to provide the crystal with electrically-driven portions. The films 18 and 19 are relatively thin and cover only part of the flat surfaces of the crystal. The electrode films have bands 18A and 19A leading to opposite corners of the crystals attached to electric conductor leads 21 and 22 respectively with solder connections 21A and 22A. The particular crystal configuration is partly determined by the device into which it is in cooperation. The device may place restrictions on its size, geometry, collecting surface size, and mounting. The particle sensing means 12 may be a quartz crystal with a capacitive electric drive having a pair of electrodes. One or both of the electrodes can be mounted so they do not touch or are spaced from the crystal.

The mode and frequency of crystal vibration, electrode configuration, the type of surface upon which the particles are deposited, and the size of the crystal must be coordinated to avoid possible loosening of the bond between the particles and films 18 and 19 by the high inertial forces associated with the mechanical vibration of the crystal. If the particles loosen, then they will not be completely effective in contributing to the incremental mass of the crystal. Most particles of practical interest as atmospheric and room aerosols, when collected on a surface, have bonding forces much higher than typical inertial forces experienced on the surface of oscillating crystals. If the particle bonding forces must be enhanced, then a rough and/or a porous collection surface material can be utilized. Also, coatings of greases and porous materials may be applied to the films 18 and 19 to increase the effectiveness of the bonding.

Oscillator circuit 11 including the particle mass sensing means 12 is stable and will drive a piezoelectric crystal, as the quartz crystal in FIG. 1, over a wide range of frequencies. The circuit follows the frequency of the quartz crystal as the frequency varies with the particle mass deposited on the surface of the crystal. The details of the oscillator circuit 11 are not shown as they do not form part of the present invention. For an example, a typical oscillator circuit controlled by an AT cut quartz crystal vibrating in the fundamental thickness-shear mode may have a nominal frequency of 6,370,000 c.p.s. when unloaded with particulate mass. The particular type of oscillator circuit within which the particle sensing means is placed is not critical.

Referring to FIG. 3, there is shown a single-stage impactor apparatus indicated generally at 23 having an oscillator and power circuit 11 connected to the impactor 23 and a frequency counter 16 connected to circuit 11. The circuit 11 may be the same as the electronic system 49 shown in FIG. 7 having a reference oscillator and mixer in addition to the primary oscillator. A vacuum pump 24 connected to an outlet 26 of the impactor apparatus 23 draws aerosol and air through an inlet 27 into the impactor apparatus. Outlet 26 is a tubular nipple 26 threaded into the bottom of block 31 having a passageway open to the bottom of chamber 29.

Referring to FIG. 5, the impactor apparatus 23 has a housing 28 enclosing a chamber 29. Housing 28 comprises a bottom block 31 supporting an intermediate block 32. Chamber 29 is closed with a top block 33. All of the blocks are secured together with bolts 34 threaded into the bottom block 31. Seals 30 between adjacent surfaces of the blocks prevent leakage of air into chamber 29. Interposed between the bottom block 31 and intermediate block 32 is a transverse flat millipore filter 35 positioned over a porous filter support 36.

The top block has a centrally located jet orifice 37 in the form of an elongated slot open to the top of chamber 29. The orifice 37 extends through a downwardly-directed projection or nose 38 positioned in close proximity to a particle mass sensing means 12. Orifice 37 is normal to or in general transverse alignment with the particle collecting surface 18. Inlet 27 is a tubular nipple threaded into the top of block 33 providing an inlet passage to orifice 37. Inlet 27 is vertically aligned with outlet 26.

As shown in FIG. 6, the particle mass sensing means 12 comprises the crystal 17 having a central portion covered with electrically-driven films 18 and 19. The leads 39 and 41 secured to opposite films support the crystal centrally in the chamber 29 immediately below the jet orifice 37 so that the aerosol flowing through the orifice is discharged directly on the film 18.

On operation of the pump 24 the aerosol indicated by the arrows 42 is continuously drawn through the impactor apparatus 23. As the aerosol flows through the jet orifice 37, the velocity of the particles increases. This causes the particles to impinge on film 18 thereby building up the total mass of the crystal. The accumulated particles on the crystal change the resonant frequency of the crystal which is sensed by the oscillator circuit 11 and transmitted to the frequency counter 16. The change in the frequency over a period of time coupled with the flow rate of air and aerosol through the housing 28 provide information determinative of the mass of the aerosol in the given volume of air.

To obtain the particulate mass in a given volume of air, the particulate mass concentration, the frequency signal is differentiated either by a differentiating circuit or by graphically measuring the slope of the frequency-time plot, which can be obtained from a strip-chart recorder. Since the volume flow rate, Q, of the carrier gas (usually air) entering the chamber 29 is known, the mass concentration, C, of the particles is found from the equation $$C = \frac{k(m)(df/dt)}{Q}$$

The ratio $df/dt$ is the calculated rate of change of frequency and $k(m)$ is the calibrated factor between frequency and particulate mass. In general, $k(m)$ is a function of particulate mass, $m$. In the ideal case $k(m)$ is a constant for all particles.

Referring to FIG. 7, there is shown a schematic view of an electorstatic precipitator apparatus for measurement of particle mass indicated generally at 43. The apparatus comprises an electrostatic precipitator 44 coupled to a vacuum pump 46 operable to continuously draw aerosol and air indicated by arrow 47 into the precipitator. The particles in the precipitator are force-collected on a surface of a particle sensing means. A negative high voltage power supply 48 is used to establish a corona discharge in the precipitator to impart an electrical charge on the aerosol particles. The corona needle and the inlet system are at ground potential and the electrode of the crystal is at a negative high voltage. Hence, a positive discharge issues from the needle to the electrode. The electric field between the needle and the crystal electrically precipitates the particles which are positively charged by the positive ions generated by the corona discharge onto the surface of the crystal. The charged particles are force-collected on the sensing means operatively coupled to an electronic system 49 which senses the frequency change of the sensing means and transmits frequency change information to a digital counter 51 and digital recording equipment. A four or five place digital counter can be used to count the frequency of the output signal from the system 49. The digital counter can be adapted to be interfaced with either digital or analog signal monitoring equipment.

The components of the electronic system 49 include a first or primary oscillator circuit 52 for particle mass detection. Circuit 52 is designed to have stability over a wide range of frequency shifts due to particle deposition. In addition, circuit 52 has stability over a wide range of temperature, humidity, and other environmental conditions. The circuit 52 floats at a negative high voltage and is powered with a small reliable battery 53. A second or reference oscillator circuit 54 is used to obtain a greatly reduced frequency output for easier and more accurate digital counting or frequency-to-analog conversion. Circuit 54 also functions to eliminate by subtraction any slight frequency shifts caused by variations in environmental conditions. The reference oscillator circuit 54 is identical to the primary oscillator circuit 52 and uses an identical crystal enclosed in such a way that it is responsive to the environmental conditions but not subject to the collection of the aerosol, rain, snow, and the like.

The outputs of the two oscillator circuits 52 and 54 are beated together in a mixer circuit 56. The frequency of the output signal of the mixer circuit 56 is the difference in the two input frequencies which is in the kilocycle range rather than the megacycle range. The oscillator circuits 52 and 54 can be enclosed in the same package to insure that they experience identical environments.

A DC to AC converter 57 powered by a battery or other source of electrical power is used to power all the electrical components of the particle measurement apparatus 43. Converter 57 has a switch provided for bypassing the converter in case the instrument is to be deployed where line power is readily available.

Referring to FIGS. 8 and 9, there is shown the electrostatic precipitator 44 including the particle sensing means. The precipitator 44 has a housing 58 having a central chamber 59. A cover 61 over the top of the chamber 59 is secured to the housing 58 with fasteners 62 as bolts. The center portion of the cover 61 has a body 63 and a neck 64 joining the body to the inside surface of cover 61. A bore 66 extending downwardly into the neck 64 is connected with lateral passageways 67 to the chamber 59. An outlet nipple 68 aligned with the bore 66 is threaded onto the top of the cover 61 to provide a tubular member for receiving a tube connected to the vacuum pump.

The bottom of body 63 is flat and has an upwardly directed central axial bore 69. The flat bottom of body 63 lies in a transverse plane in the lower end of chamber 59. A lateral passage 71 leads into the top of the bore 69.

A short tubular member 73 joins the passage 71 with an inlet nipple 74 secured to the outside of housing 58. The nipple 74 and tube 73 provide a direct passageway from the outside of housing 58 to the bore 69.

A corona needle or wire 76 attached to the body is positioned longitudinally along the central axis of the bore 69. The point of the needle 76 is in alignment with the open end of the bore 69. The needle 76 is electrically connected to the negative high voltage power supply 48. An annular sleeve or insert 77 of electrical insulative material is mounted in the lower end of body 63 concentric with the bore 69 and axially around the end of needle 76.

As shown in FIG. 10, the bottom of housing 58 has a recess accommodating a plate 78 having an inwardly directed peripheral flange 79 extended transversely into the chamber 59. Located below plate 78 is a particle sensing means comprising a crystal 80 carrying thin electrode films 81 and 82 attached to the electrical conductor leads 83 and 84. The crystal 80 is positioned in a removable bottom plate 86 which closes the end of the chamber 59. Releasable fasteners 87, as bolts, attach the plate 86 to the housing 58. The plate 86 holds the crystal 80 in a transverse position across the end of the chamber 59 spaced from the end of the body 63 and open end of bore 69. The space between the open end of bore 69 and electrode 81 is the precipitating gap which can be about 3/16 of an inch. The leads 83 and 84 extended outwardly through a hole 88 in the plate 86 are connected to the oscillator circuit 52.

In use, aerosol and air are continuously moved into the precipitator 44 by the action of the vacuum pump 46 at a flow rate which provides enough time to charge the particles with the corona discharge and precipitate the particles on the surface of the sensing means. The aerosol and air flows through the inlet nipple 74 and the connecting sleeve or tube 73 into the bore 69. The air and aerosol continuously flows past the needle 76 into the bottom of the chamber 59. With the needle subjected to a high voltage, it produces a positive corona discharge and imparts an electrical charge on the particles. The charged particles shown by arrows 91 are driven toward and deposited on the electrode 81 thereby changing the mass of the crystal 80. The ions shown as dots 92 in the corona discharge, shown as dots 92 in FIG. 10, which are collected by the crystal do not affect the stability of the crystal oscillation. With the entire inlet of the precipitator at ground potential, there is no significant amount of particles deposited on the housing or body of the precipitator due to natural electric charge.

The crystal 80 can be removed from the precipitator for cleaning or chemical analysis by merely removing the plate 86 and then separating the crystal from the plate. The electrostatic precipitator 44 has a high collection efficiency. Substantially all the particles are uniformly deposited or collected on the crystal electrode. Only a negligible amount of particles leave the system. Simultaneous with particle collection the particle sensing means provides information as to particle mass.

The embodiments of the invention in which an exclusive property or privilege is claimed are defined as follows:

1. An apparatus for measurement of particle mass of an aerosol comprising: particle mass sensing means having a resonant frequency and a particle collection surface for collecting particles of an aerosol, means to drive and sense the resonant frequency of the sensing means, means imparting a force field on the particle for forcing the particles directly into contact with the particle collection surface with a force sufficient to place the particles in contact with the particle collection surface, and monitor means to read the sensed resonant frequency providing information as to the changes in resonant frequency of the sensing means caused by the force-collection of particles on the particle collection surface.

2. The apparatus of claim 1 wherein: the particle sensing means includes a piezoelectric crystal.

3. The apparatus of claim 1 wherein: the particle sensing means is a quartz piezoelectric crystal.

4. The apparatus of claim 3 wherein: the quartz crystal vibrates in its thickness-shear mode.

5. The apparatus of claim 3 wherein: the quartz crystal is of the type having an AT cut.

6. The apparatus of claim 1 wherein: the particle sensing means includes a quartz crystal having opposite surfaces and said particle collection surface being on a separate electrical conductive means secured to at least one of said opposite surfaces.

7. The apparatus of claim 6 wherein: the electrical conductive means is a film of metal.

8. The apparatus of claim 6 wherein: the electrical conductive means is a film of metal coated with material having a surface for collecting particles.

9. The apparatus of claim 1 wherein: the particle sensing means includes a quartz crystal with a capacitive electric drive having a pair of electrodes, at least one of the electrodes spaced from the crystal.

10. The apparatus of claim 1 wherein: the particle mass sensing means includes a quartz crystal, and electrical conductive means associated with the crystal, said electrical conductive means being coated with a material having a surface for collecting particles.

11. The apparatus of claim 1 wherein: the means to sense the resonant frequency of the sensing means is an oscillator circuit connected to the sensing means.

12. The apparatus of claim 11 wherein: a reference oscillator circuit and mixer are used in conjunction with said oscillator circuit of claim 11.

13. The apparatus of claim 1 including: a housing having a chamber and wherein the means for directing particles toward the particle sensing means comprises a nozzle in said housing, said nozzle having a discharge opening located in transverse alignment with the particle collection surface of the sensing means, and means for moving particles through said nozzle into engagement with the particle collection surface.

14. The apparatus of claim 13 wherein: the means for moving particles through said nozzle comprises pump means operable to draw air and particles from the chamber.

15. The apparatus of claim 13 wherein: said housing has a removable section containing said nozzle.

16. The apparatus of claim 13 including: means for moving the surface of the crystal relative to the nozzle for the purpose of obtaining a generally uniform particle distribution on the surface of the mass sensing means.

17. The apparatus of claim 1 wherein: the means for forcing particles into contact with the particle collection surface is a device imparting a force field on said particles for forcing particles directly into contact with the particle collection surface with a force sufficient to place the particles in contact with the particle collection surface.

18. The apparatus of claim 17 wherein: the device imparts a gravitational force field on said particles.

19. The apparatus of claim 17 wherein: the device imparts an electrostatic force field on said particles.

20. The apparatus of claim 17 wherein: the device imparts a centrifugal force field on said particles.

21. The apparatus of claim 17 wherein: the device imparts a thermal force field on said particles.

22. The apparatus of claim 17 wherein: the device imparts a magnetic force field on said particles.

23. The apparatus of claim 17 wherein: the device imparts a light radiation force field on said particles.

24. An apparatus for measurement of particle mass of an aerosol comprising: a housing having a chamber, a body located in said chamber, particle mass sensing means having a resonant frequency and a particle collection surface for collecting particles located in the chamber, means to drive and sense the resonant frequency of the sensing means, said body having a passageway open toward the particle mass sensing means, means for forcing particles directly into contact with the particle collection surface including means for establishing a corona discharge located in said passage to electrically charge the particles moving through the passageway and for electrostatically depositing the charged particles on the particle mass sensing means, means to move gas and particles through said passage into the chamber, and monitor means to read sensed resonant frequency providing information as to the changes in resonant frequency of the sensing means caused by the force-collection of particles on the particle collection surface.

25. The apparatus of claim 24 wherein: the means for establishing a corona discharge comprises a needle located longitudinally in said passageway.

26. The apparatus of claim 24 wherein: the means for establishing a corona discharge comprises a live wire.

27. The apparatus of claim 24 wherein: the means to move gas and particles through the passage into the chamber comprises pump means operable to draw gas and particles from the chamber.

28. The apparatus of claim 24 wherein: the housing includes a removable member carrying the particle mass sensing means and positioning the particle mass sensing means in generally transverse alignment with the passageway in the body.

29. A method of measurement of particle mass of an aerosol comprising: force depositing particles of an aerosol directly onto a particle collection surface of a particle sensing means having a resonant frequency, with a force sufficient to place the particles in contact with the particle collection surface, driving the particle sensing means at its resonant frequency, and monitoring the resonant frequency change of the particle sensing means during the force depositing of particles on the particle collection surface of the particle sensing means to provide information of the particle mass collected on the particle collection surface.

30. The method of claim 29 wherein: the particles are directed toward the particle sensing means by a force field generated by a particle collector device.

31. The method of claim 29 wherein: the particles are force deposited by impaction of the particles onto the surface of the particle sensing means.

32. The method of claim 29 wherein: the particles are electrically charged with a corona discharge and the charged particles are force deposited onto the particle collection surface of the particle sensing means by electrostatic precipitation.

33. An apparatus for measurement of particle mass of an aerosol comprising: a housing having a chamber and a passageway leading from a source of aerosol into the chamber, particle mass sensing means having a resonant frequency and a particle collection surface for collecting particles located in the chamber, means to drive and sense the resonant frequency of the particle mass sensing means, means for forcing particles directly into contact with the particle collection surface with a force sufficient to place the particles in contact with the particle collection surface, said force-collecting means including means for establishing a corona discharge within the housing to electrically charge the particles in the chamber and electrostatically deposit the charged particles on the particle collection surface, means to move gas and particles through the passageway into said chamber, and monitor means to read the sensed resonant frequency providing information as to the change in resonant frequency of the sensing means caused by the force-collection of particles on the particle collection surface.

References Cited

UNITED STATES PATENTS

| | | | |
|---|---|---|---|
| 2,702,471 | 2/1955 | Vonnegut | 73—28 |
| 2,953,013 | 9/1960 | Bergstedt | 73—432X |
| 3,164,004 | 1/1965 | King, Jr. | 73—23 |
| 3,473,118 | 10/1969 | Tassicker et al. | 73—28X |

LOUIS R. PRINCE, Primary Examiner

J. W. ROSKOS, Assistant Examiner

U.S Cl. X.R.

73—432; 310—8.1; 324—71